(12) United States Patent
Bara et al.

(10) Patent No.: US 11,452,969 B2
(45) Date of Patent: Sep. 27, 2022

(54) REDUCING ACID GASES FROM STREAMS

(71) Applicant: THE BOARD OF TRUSTEES OF THE UNIVERSITY OF ALABAMA, Tuscaloosa, AL (US)

(72) Inventors: Jason E. Bara, Tuscaloosa, AL (US); Brian Flowers, Midland, TX (US); Max Mittenthal, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 622 days.

(21) Appl. No.: 16/329,810

(22) PCT Filed: Aug. 31, 2017

(86) PCT No.: PCT/US2017/049590
§ 371 (c)(1),
(2) Date: Mar. 1, 2019

(87) PCT Pub. No.: WO2018/045158
PCT Pub. Date: Mar. 8, 2018

(65) Prior Publication Data
US 2019/0193020 A1 Jun. 27, 2019

Related U.S. Application Data

(60) Provisional application No. 62/382,847, filed on Sep. 2, 2016.

(51) Int. Cl.
B01D 53/14 (2006.01)
B01D 53/00 (2006.01)
(Continued)

(52) U.S. Cl.
CPC .......... *B01D 53/1493* (2013.01); *B01D 11/00* (2013.01); *B01D 11/04* (2013.01);
(Continued)

(58) Field of Classification Search
None
See application file for complete search history.

(56) References Cited

U.S. PATENT DOCUMENTS 2,926,752 A * 3/1960 Redemann ......... B01D 53/1475
95/163
4,578,094 A 3/1986 Mehra
(Continued)

FOREIGN PATENT DOCUMENTS

WO WO-2016208814 A1 * 12/2016 ............. B01D 53/14

OTHER PUBLICATIONS

International Search Report and Written Opinion, issued in related International Application No. PCT/US2017/049590.
(Continued)

*Primary Examiner* — Daniel Berns
(74) *Attorney, Agent, or Firm* — Meunier Carlin & Curfman LLC

(57) ABSTRACT

Methods of reducing acid gas from a stream, comprising contacting the stream with a solvent system comprising a glycerol derivative are described herein. Disclosed herein is a composition comprising a glycerol derivative and an acid gas. A method for sweetening a natural gas stream comprising contacting a solvent system comprising a glycerol derivative with a natural gas stream is described herein.

26 Claims, 2 Drawing Sheets

(51) Int. Cl.
　　　B01D 53/22　　　(2006.01)
　　　B01D 11/00　　　(2006.01)
　　　B01D 11/04　　　(2006.01)
　　　B01D 69/08　　　(2006.01)
　　　C01B 3/52　　　(2006.01)
　　　C10G 70/00　　　(2006.01)
　　　C10L 3/10　　　(2006.01)

(52) U.S. Cl.
　　　CPC ......... *B01D 53/00* (2013.01); *B01D 53/1462* (2013.01); *B01D 53/1475* (2013.01); *B01D 53/1481* (2013.01); *B01D 53/22* (2013.01); *B01D 69/08* (2013.01); *C01B 3/52* (2013.01); *C10G 70/00* (2013.01); *C10L 3/102* (2013.01); *C10L 3/103* (2013.01); *C10L 3/104* (2013.01); *B01D 2252/202* (2013.01); *B01D 2252/2023* (2013.01); *B01D 2258/0283* (2013.01); *C01B 2203/0415* (2013.01); *C01B 2203/0475* (2013.01); *C01B 2203/0485* (2013.01); *C10L 2290/541* (2013.01); *C10L 2290/548* (2013.01)

(56) References Cited

U.S. PATENT DOCUMENTS

| | | | |
|---|---|---|---|
| 5,281,254 A * | 1/1994 | Birbara | B01D 53/268 95/44 |
| 8,506,914 B2 | 8/2013 | Bara | |
| 2013/0118910 A1 | 5/2013 | Teamey et al. | |
| 2014/0166288 A1 * | 6/2014 | Bailey | E21B 43/34 166/305.1 |

OTHER PUBLICATIONS

Garist et al. Building Blocks for Ionic Liquids: Vapor Pressures and Vaporization Enthalpies of Alkoxy Derivatives of Imidazole and Benzimidazole. Ind. Eng. Chem. Res. 2012, 51, (47), 15517-15524.
NETL DOE/NETL Carbon Capture Program Overview, program 115, Aug. 2017 (4 pages).
Nunes et al., Solubility of CO2 in glycerol at high pressures. Fluid Phase Equilibria 358 (2013) 105-107.
Rochelle, G. T., Amine Scrubbing for CO2 Capture. Science 2009, 325, (5948), 1652-1654.
Segur et al. Viscosity of glycerol and its aqueous solutions. Ind. Eng. Chem. 43 (1951) 2117-2120.
Shannon, et al., Evaluation of Alkylimidazoles as Physical Solvents for CO2/CH4Separation, Ind. Eng. Chem. Res. 2012, 51, 515-522.
Sheely, M. L., Glycerol Viscosity Tables, Industrial & Engineering Chemistry 1932, 24, (9), 1060-1064.
Stull, D. R. Vapor Pressure of Pure Substances. Organic and Inorganic Compounds. Industrial & Engineering Chemistry 1947, 39, (4), 517-540.
Sutter et al. 1,2,3-Trimethoxypropane and Glycerol Ethers as Bio-Sourced Solvents from Glycerol. Synthesis by Solvent-Free Phase-Transfer Catalysis and Utilization as an Alternative Solvent in Chemical Transformations, ChemCatChem 2013, 5, (10), 2893-2904.
Sutter et al. 1,2,3-Trimethoxypropane, a glycerol-based solvent with low toxicity: new utilization for the reduction of nitrile, nitro, ester, and acid functional groups with TMDS and a metal catalyst. Green Chemistry 2013, 15, (11), 3020-3026.
Sutter et al. Glycerol Ether Synthesis: A Bench Test for Green Chemistry Concepts and Technologies. Chemical Reviews 2015, 115, (16), 8609-8651.
International Preliminary Report on Patentability dated Mar. 14, 2019 in International Application No. PCT/US2017/049590 (8 pages).

* cited by examiner

REDUCING ACID GASES FROM STREAMS

CROSS-REFERENCE TO RELATED APPLICATIONS

This application is a national stage application filed under 35 U.S.C. § 371 of PCT/US2017/049590 filed Aug. 31, 2017, which claims the benefit of U.S. Provisional Application No. 62/382,847, filed Sep. 2, 2016, both of which are hereby incorporated herein by reference in their entireties.

FIELD

The subject matter disclosed herein generally relates to methods and solvent systems for reducing acid gases from streams.

BACKGROUND

Most discussions of "$CO_2$ capture and sequestration" (CCS) in recent years relate to the removal of $CO_2$ from low partial pressure and low concentration post-combustion sources, such as the flue gas of coal- and natural gas-fired power plants (See Rochelle, *Science* 325 (2009) 1652-1654). However, the removal of $CO_2$ from high concentration, high pressure sources is a well-established, ongoing, and important need within many chemical processes/industries. Removal of $CO_2$ from raw natural gas to levels below 2 vol % is necessary to limit pipeline corrosion and maintain heating value. Separation of $CO_2$ is also a key component of water-gas shift reactions that produce $H_2$ and $CO_2$ from CO and $H_2O$, which is important to $NH_3$ synthesis and future electric power generation from coal or other feedstocks via integrated gasification combined cycle (IGCC) processes.

Absorptive (i.e., solvent-based) technologies are the most widely used and mature processes for $CO_2$ removal from industrial gas streams. The selection of an appropriate solvent for $CO_2$ removal is related to the inlet partial pressure and outlet purity specification. If the inlet partial pressure of $CO_2$ is low (e.g., flue gas), then a reactive or "chemical" solvent such as aqueous monoethanolamine (MEA) or functionalized imidazoles (see e.g., U.S. Pat. No. 8,506,914) can be used. The capacity of a chemical solvent can be limited by the concentration (e.g., molarity) of active species in solution. However, once the active species has become saturated with $CO_2$, increased $CO_2$ pressure can result in minimal additional absorption in the chemical solvent. If the inlet pressure is high and only "bulk" (~90%) removal of $CO_2$ is required, then a non-reactive or "physical" solvent can be utilized. Physical solvents are typically polar (e.g. non-hydrocarbon) organic solvents with suitable thermophysical properties such as low viscosity, low vapor pressure, high $CO_2$ absorption capacity, thermal stability, etc. The capacity of a physical solvent is dependent on the partial pressure of $CO_2$ in the gas stream, typically showing a linear (i.e. Henry's Law) relationship.

Relative to chemical solvents which require that chemical bonds be broken at elevated temperature in order to release the $CO_2$ and regenerate the solvent, physical solvents typically require much milder heating and/or vacuum (flash) stripping. As the throughput of $CO_2$ is related to the volumetric flowrate of solvent, the process footprint will be minimized and economics optimized based on the selection of the appropriate class of solvent—chemical or physical. Under certain conditions, hybrid solvents containing amines, water and a polar organic solvent have also been employed, with Shell's SULFINOL™ as one example.

Among physical solvent processes, the SELEXOL™ process is perhaps the most well-known. SELEXOL™ utilizes dimethyl ethers of poly(ethylene glycol) (DMPEG) as the working fluid. DMPEG has a very low volatility, high boiling point (275° C.) and moderate viscosity (5.8 cP at 20° C.). It is inexpensively produced from the polymerization of ethylene oxide (oxirane) initiated and terminated respectively by methylating species such as MeOH and $CH_3Cl$ in the presence of a strong base (e.g., NaOMe or NaOH). Other physical solvent processes include Rectisol, Purisol, Morphysorb and Fluor Solvent, which utilize chilled MeOH, N-methylpyrrolidinone (NMP), mixtures of morpholine derivatives and propylene carbonate (PC) as the respective absorbents.

The conventional unit operation for gas absorption is vertical packed or trayed-columns, where efficient mass transfer requires a balance between sufficient interfacial area (promoting gas-liquid contact) and a high void fraction (minimizing pressure drop). Although this technology has been in use for over a century, disadvantages include large profiles (e.g., height and footprint) and relatively low surface area to volume ratios (<200 $m^2/m^3$). Issues such as foaming and flooding may arise from the direct gas-liquid contact.

Hollow fiber membrane contactors (HFMCs) can be an alternative to conventional absorption columns, and may offer significant reductions in the capital expenditures, footprints and solvent inventory associated with gas absorption processes. HFMCs can possess much higher interfacial area, up to 2000 $m^2/m^3$, which can greatly improve mass transfer rates relative to packing or trays. Major advantages of membrane contactors include much higher specific surface areas (up to 2000 $m^2/m^3$), increased mass transfer coefficients, reduced solvent inventory, and minimized process footprint. However, performance of HFMCs may be more sensitive to solvent viscosity in terms of pressure drop down the length of the fiber and reduced mass transfer rates which will necessitate more membrane area to achieve the desired level of gas absorption. These effects become more pronounced if the solvent is chilled. In this context, DMPEG, the absorption fluid of the SELEXOL™ process, may not be an ideal choice for HFMCs. Advanced physical solvents with low vapor pressure, low viscosity and good $CO_2$ absorption performance are needed for the efficient operation of HFMCs. The compositions and methods disclosed herein address these and other needs.

SUMMARY

In accordance with the purposes of the disclosed materials, compounds, compositions, and methods, as embodied and broadly described herein, the disclosed subject matter, in one aspect, relates to compounds and compositions and methods for preparing and using such compounds and compositions. In some aspects, the disclosed subject matter relates to methods for reducing acid gases from a stream, comprising contacting the stream (e.g., a gas stream or a liquid stream) with a solvent system comprising a glycerol derivative. The glycerol derivative can be functionalized by substituting the hydrogen in each hydroxyl functional group in glycerol with a different functional group. In some aspects, the glycerol derivative can be functionalized with an alkyl or alkoxy functional group in place of the hydrogen atom in each hydroxyl functional group.

In some aspects, the disclosed subject matter relates to a solvent system for reducing acid gas from a stream comprising a glycerol derivative and an acid gas.

Methods for sweetening a natural gas feed stream are also provided herein. The methods comprise contacting the natural gas feed stream comprising acid gases with a solvent system comprising a glyercol derivative as described herein.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying Figures, which are incorporated in and constitute a part of this specification, illustrate several aspects described below.

DETAILED DESCRIPTION

Figure 1:
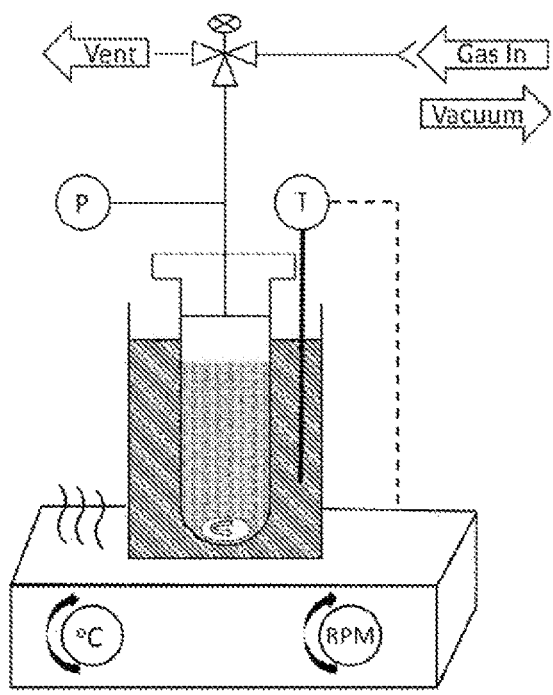
FIG. 1 shows a schematic of a gas solubility apparatus.

The materials, compounds, compositions, articles, and methods described herein can be understood more readily by reference to the following detailed description of specific aspects of the disclosed subject matter and the Examples and Figures included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an ionic liquid" includes mixtures of two or more such ionic liquids, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

By "reduce" or other forms of the word, such as "reducing" or "reduction," is meant lowering of an event or characteristic (e.g., acid gas in a stream). It is understood that this is typically in relation to some standard or expected value, in other words it is relative, but that it is not always necessary for the standard or relative value to be referred to. For example, "reduces $CO_2$" means reducing the amount of $CO_2$ in a stream relative to a standard or a control. As used herein, reduce can include complete removal. In the disclosed methods, reduction can refer to a 10 mol %, 20 mol %, 30 mol %, 40 mol %, 50 mol %, 60 mol %, 70 mol %, 80 mol %, 90 mol %, or 100 mol % decrease as compared to the standard or a control. It is understood that the terms "sequester," "capture," "remove," and "separation" are used synonymously with the term "reduce."

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

The term "acid gas" as used herein refers to chemical compounds that are capable of vaporizing to a significant amount or that exist as a gas at ambient conditions with significant quantities of one or more gases that can be considered a Lewis Acid. A compound is a Lewis Acid if the compound can act as an electron pair acceptor. The "acid gases" described herein are found in the streams, such as natural gas feeds. Examples of acid gases include $CO_2$, CO, COS, $H_2S$, $SO_2$, NO, $N_2O$, mercaptans, $H_2O$, $O_2$, $H_2$, $N_2$, $Cl_2$, volatile organic compounds, and mixtures of these.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. In specific examples, when a moiety is indicated as being substituted herein, it can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkyl alcohol" is used in another, it is not meant to imply that the term "alkyl" does not also refer to specific terms such as "alkyl alcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, triptycene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl or heteroaryl group can be substituted or unsubstituted. The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" is a short hand notation for C=O.

The terms "amine" or "amino" as used herein are represented by the formula $NA^1A^2A^3$, where $A^1$, $A^2$, and $A^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" as used herein is represented by the formula —C(O)O$^-$.

The term "ester" as used herein is represented by the formula —OC(O)$A^1$ or —C(O)O$A^1$, where $A^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $A^1C(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" as used herein refers to the halogens fluorine, chlorine, bromine, and iodine.

The term "hydroxyl" as used herein is represented by the formula —OH.

The term "nitrile" as used herein is represented by the formula —CN.

A "fluoroalkyl" as used herein is an alkyl group where one or more of the hydrogen atoms is substituted with a fluorine atom.

The term "nitrile terminated alkyl" as used herein is represented by the formula $A^1CN$, where $A^1$ is an alkyl group as described above.

The term "trifluoromethyl terminated alkyl" as used herein is represented by the formula $A^1CF_3$, where $A^1$ is an alkyl group as described above.

"$A^1$," "$A^2$," "$A^3$," "$A^n$," etc., where n is some integer, as used herein can, independently, possess one or more of the groups listed above. For example, if $A^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Reference will now be made in detail to specific aspects of the disclosed materials, compounds, compositions, articles, and methods, examples of which are illustrated in the accompanying Examples and Figures.

Materials and Compositions

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), Sigma (St. Louis, Mo.), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989). Other materials, such as the ligands, disclosed herein can be obtained from commercial sources.

Method of Use

The solvent systems disclosed herein can be used to reduce acid gases from a stream. Described herein is a method for reducing acid gas from a stream, comprising contacting the stream with a solvent system comprising a glycerol derivative as described herein. The acid gases present in the stream can absorb and/or dissolve into the solvent system comprising the glycerol derivative. The acid gases present in the stream can be reduced from the stream and increased in the solvent system. The solvent system and the stream can then be separated. The stream will have a reduced amount of acid gas and the solvent system will have an increased amount of acid gas.

The stream can be a liquid stream, including, for example, a solvent where a chemical reaction is taking place, or a gaseous stream, including, for example, natural gas stream or a flue gas stream.

As used herein, acid gases can include undesirable gaseous components found in a source and having a molecular weight lower than 150 g/mol. For example, the acid gases can have a molecular weight lower than 140 g/mol, 130 g/mol, 120 g/mol, 110 g/mol, 100 g/mol, 90 g/mol, 80 g/mol, 70 g/mol, 60 g/mol, 50 g/mol, 40 g/mol, 30 g/mol, 20 g/mol, or the like, where any of the stated values can form an upper or lower endpoint of a range. Examples of acid gases include $CO_2$, CO, COS, $H_2S$, $SO_2$, NO, $N_2O$, mercaptans, $H_2O$, $O_2$, $H_2$, $N_2$, $Cl_2$, volatile organic compounds, and mixtures of these. In some examples, the acid gas is selected from the group consisting of $CO_2$, $H_2S$, and $SO_2$. In some examples, the acid gas is a Lewis Acid, such as $CO_2$, $H_2S$, and $SO_2$. In some examples, the method for reducing acid gases from a stream can separate $CO_2$, $H_2S$, and $SO_2$ from $C_1$-$C_8$ hydrocarbons (e.g., methane and propane). In some examples, the method for reducing acid gases from a stream can separate $CO_2$, $H_2S$, and $SO_2$ from a natural gas stream.

The method for reducing acid gases from a stream can include contacting the stream with an effective amount of a solvent system as described herein. In some embodiments, the solvent system comprises a glycerol derivative. For example, acid gases from a gas stream (e.g., a natural gas stream or a flue gas stream) can be reduced according to this method.

In some examples, the method for reducing acid gases from a stream can include a liquid stream. For example, acid gases, such as $CO_2$ can be produced as a byproduct of a chemical reaction. The acid gases can either remain dissolved in the solvent of the chemical reaction or pressurize the headspace above the chemical reaction. The solvent system can contact the liquid stream (i.e., the solvent with dissolved acid gases) to remove the acid gases or the solvent system can contact the pressurized head space above the chemical reaction to remove the acid gases. In some examples, the solvent system can contact a water-gas shift reaction mixture to reduce $CO_2$.

In some examples, the solvent system can contact the stream in a hollow fiber membrane contactor. In some examples, the solvent system can be used within a hollow fiber membrane contactor. In some examples, the solvent system can contact the stream in a vertical packed or trayed-column. In some examples, the solvent system can contact the stream as in FIG. 1.

Further described herein is a method for sweetening a natural gas feed stream. The method comprises contacting the natural gas feed stream with an effective amount of a solvent system as described herein to form a purified natural gas feed stream and a gas-rich solvent system. The purified natural gas feed stream can then be separated from the gas-rich solvent system. In some embodiments, the acid gases are reduced from the gas-rich solvent system to regenerate the solvent system. The system can be regenerated by heating or pressurizing the gas-rich solvent system.

Compositions

As noted, the disclosed methods comprise contacting a stream with a solvent system comprising a glycerol derivative. A glycerol derivative is a compound that has glycerol as a backbone or core structural component.

Glycerol, 1,2,3-trihydroxypropane, is a simple polyol comprising a propane with three alcohol functional groups. Glycerol has a wide range of applications, including use as an organic solvent and as a sweetener in foods. Glycerol is a byproduct of biodiesel production, and due to the recent expansion of biodiesel product, there is a glut of glycerol in the market.

Unfortunately, glycerol is not an ideal choice for a solvent to dissolve $CO_2$ because of the relatively low solubility of $CO_2$ in glycerol when compared to other alcohols of similar chain length (see Nunes et al., *Fluid Phase Equilibria* 358 (2013) 105-107) and pure glycerol has a high viscosity at 25° C. of at least 1000 cP (see Segur and Oberstar, *Ind. Eng. Chem.* 43 (1951) 2117-2120). Although glycerol is a low cost liquid that has a very low volatility ($T_b$=290° C.), it is too viscous in its pure form ($\mu$>1000 cP at 25° C.) to be considered as a viable physical solvent for $CO_2$ absorption. Dilution with $H_2O$ to reduce viscosity would also likely have a detrimental impact on $CO_2$ solubility in glycerol-containing solutions.

However, disclosed herein are lower viscosity glycerol derivatives, which can allow the glycerol derivatives to be used as physical solvents for the absorption of $CO_2$ from streams.

In some aspects, disclosed herein are glycerol derivatives, which can be used to reduce the amount of acidic gases from streams. In some examples, the glycerol derivative can be represented by Formula I.

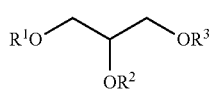

Formula I wherein $R^1$, $R^2$, and $R^3$ can be independently selected from the group consisting of substituted or unsubstituted $C_{1-20}$ alkyl, substituted or unsubstituted $C_{2-20}$ alkenyl, substituted or unsubstituted $C_{2-20}$ alkynyl, substituted or unsubstituted cycloalkyl, substituted or unsubstituted aryl, substituted or unsubstituted thio, substituted or unsubstituted alkoxyl, substituted or unsubstituted aryloxyl, $C_{2-20}$ fluoroalkyl, $C_2$-$C_{20}$ trifluoromethyl terminated alkyl, and $C_{2-20}$ nitrile terminated alkyl.

In some examples, $R^1$, $R^2$, and $R^3$ can be independently selected from the group consisting of substituted or unsubstituted $C_{1-20}$ alkyl, substituted or unsubstituted alkoxyl, and $C_2$-$C_{20}$ trifluoromethyl terminated alkyl. In some examples, $R^1$, $R^2$, and $R^3$ can be independently selected from the group consisting of $C_{1-20}$ alkyl substituted with one or more ethers, $C_{1-20}$ alkyl substituted with one or more $C_{1-5}$ alkyl, $C_{1-20}$ alkyl substituted with one or more halogen, $C_{1-20}$ alkyl substituted with one or more amine, $C_{1-20}$ alkyl substituted with one or more hydroxyl, $C_{1-20}$ alkyl substituted with one or more $C_{1-5}$ alkoxy, $C_{1-20}$ alkoxy substituted with one or more ethers, $C_{1-20}$ alkoxy substituted with one or more $C_{1-5}$ alkyl, $C_{1-20}$ alkoxy substituted with one or more halogen, $C_{1-20}$ alkoxy substituted with one or more amine, $C_{1-20}$ alkoxy substituted with one or more hydroxyl, and $C_{1-20}$ alkoxy substituted with one or more $C_{1-5}$ alkoxy.

In some examples, the glycerol derivative can be selected from the group consisting of 1,2,3-trimethoxypropane, 1,2,3-triethoxypropane, 1,2,3-tri(2-methoxyethyl)propane, and 1,2,3-tris(2,2,2-trifluoroethoxy)propane.

In some examples, the glycerol derivative is 1,2,3-trimethoxypropane.

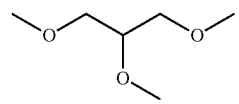

1,2,3-trimethoxypropane

In some examples, the glycerol derivative has a lower viscosity than pure glycerol. In some examples, the glycerol derivative has a viscosity at or below 1000 cP at 25° C., at or below 900 cP at 25° C., at or below 800 cP at 25° C., at or below 700 cP at 25° C., at or below 600 cP at 25° C., at or below 500 cP at 25° C., at or below 400 cP at 25° C., at or below 300 cP at 25° C., at or below 200 cP at 25° C., at or below 100 cP at 25° C., at or below 90 cP at 25° C., at or below 80 cP at 25° C., at or below 70 cP at 25° C., at or below 60 cP at 25° C., at or below 50 cP at 25° C., at or below 40 cP at 25° C., at or below 30 cP at 25° C., at or below 20 cP at 25° C., at or below 10 cP at 25° C., at or below 9 cP at 25° C., at or below 8 cP at 25° C., at or below 7 cP at 25° C., at or below 6 cP at 25° C., at or below 5 cP at 25° C., at or below 4 cP at 25° C., at or below 3 cP at 25° C., at or below 2.5 cP at 25° C., at or below 2 cP at 25° C., at or below 1.5 cP at 25° C., or at or below 1 cP at 25° C. When viscosity is discussed herein, all viscosity values are tested according to Example 5.

Solvent System

Also disclosed herein is a solvent system comprises a glycerol derivative. In some examples, a solvent system can comprise a glycerol derivative and an organic solvent. In some examples, a solvent system can comprise a glycerol derivative and optionally an organic solvent or water. The organic solvent can be selected from the group consisting of methanol, ethanol, 1-propanol, 2-propanol, diglyme, DMPEG, dichloromethane, chloroform, ethyl acetate, tetrahydrofuran, acetone, acetonitrile, N,N-dimethylformamide, dimethyl sulfoxide, glycol solvents, acetone, butanol, another suitable organic solvent, and mixtures thereof.

In some examples, the solvent system comprises at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 96%, at least 97%, at least 98%, at least 99%, or at least 99.5% of the glycerol derivative by volume.

In some examples, disclosed herein is a solvent system for reducing acid gas from a stream comprising a glycerol derivative and acid gas.

The examples below are intended to further illustrate certain aspects of the methods and compositions described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Glycerol (>99.7%) was purchased from BDH. Dimethyl sulfate (DMS) (>99%) was purchased from Sigma-Aldrich. Tert-butyl ammonium hydrogen sulfate (TBAHS) (98%) was purchased from Baker. $CaH_2$ (90-95%) and diglyme (99%) were purchased from Alfa Aesar. NaOH (pellets, ACS Grade) was purchased from VWR. Research grade $CO_2$ was purchased from Airgas (Radnor, Pa. USA).

Example 1: Synthesis of 1,2,3-Trimethoxypropane 1,2,3-Trimethoxypropane (1,2,3-TMP) was synthesized from glycerol, NaOH and dimethyl sulfate (DMS) in the presence of $(n-Bu)_4NHSO_4$, or TBAHS, a phase transfer catalyst, in the absence of any additional solvent according to Scheme 1.

Scheme 1

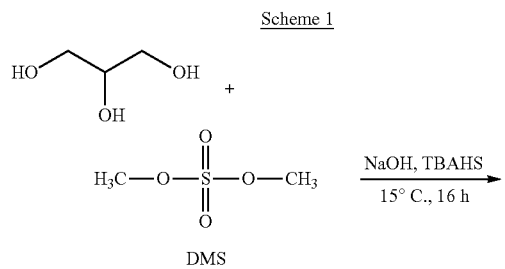

-continued

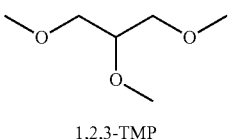

1,2,3-TMP

In a 2 L double walled glass reactor equipped with a cooling system (water stream) and a mechanical anchor Teflon stirrer, glycerol (139 g, 111 mL, 1.51 mol, 1 eq.), 101 g of NaOH (2.53 mol, 1.65 eq.) and 5.28 g of $(n-Bu)_4NHSO_4$ (TBAHS, 15.6 mmol, 10 mol %) were successively introduced in small portions under stirring. The mixture was then stirred at room temperature for 30 min until the medium became more homogeneous. After cooling down the reactor to 15° C. with a cold water stream, dimethyl sulfate (DMS, 166 g, 125 mL, 1.30 mol, 0.85 eq) was carefully added dropwise to the reaction medium. Next, the rest of NaOH was slowly added (101 g, 2.53 mol, 1.65 eq) before adding the remaining DMS dropwise (166 g, 125 mL, 1.30 mol, 0.85 eq). The basicity of the mixture was then checked by pH measurement, and the medium was vigorously stirred at room temperature for 16 h.

Following the reaction, pentane (1000 mL) was added to the solids and the slurry was mixed for several hours via mechanical mixing. The solids were then separated by vacuum filtration, and the filtrate volume was reduced to ~150 mL via rotary evaporation, followed by distillation of 1,2,3-TMP over $CaH_2$. Using Karl-Fisher titration, the $H_2O$ content of 1,2,3-TMP post-distillation was determined to be >1000 ppm, which was reduced to ~75 ppm when stored in crimped septum vials over activated 3 Å carbon molecular sieves. $^1H$ and $^{13}C$ NMR characterization data and spectra were consistent with the synthesis of 1,2,3-TMP.

Example 2: Prophetic Examples of Other Glycerol Derivatives

Other glycerol derivatives can be synthesized using similar reaction protocols to Example 1. For example, glycerol derivatives can be synthesized using alkylation reaction protocols, to synthesize the derivatives in Formula I.

Formula I

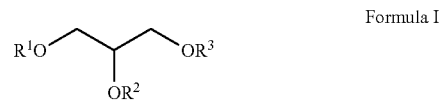

In Formula I, $R^1$, $R^2$, and $R^3$ can be independently selected from alkyl or alkyl ether functional group. These compounds can be synthesized in an alkylation reaction with the appropriate dialkyl sulfate. For example, a similar reaction to Example 2 can be performed with glycerol and diethyl sulfate to synthesize 1,2,3-triethoxypropane. In one example, an alkylation reaction can be used to synthesize 1,2,3-triisopropoxypropane by reacting isopropyl tosylate with glycerol.

Other alkylating agents may be used to produce a derivative as in Formula I. Some examples include methyl iodide, ethyl bromide, ethyl chloride, diethyl sulfate, dipropyl sulfate, 1-chlorobutane, 1-chloropropane, 2-chloroethyl methyl ether, 2-chloroethyl ethyl ether, 1-bromobutane, and 2,2,2-Trifluoroethyl 4-toluenesulfonate.

Example 3: Density Measurements

Density data were measured using a Mettler-Toledo DM45 DeltaRange density meter that operates using electromagnetically induced oscillation of a glass U-form tube, with automatic compensation for changes in atmospheric pressure. The density meter can measure samples in the liquid phase with densities between 0-3 g/cm³ and requires a minimum sample size of 1.2 cm³. Density measurements are accurate within ±0.00005 g/cm³ for all operating temperatures. Densities of 1,2,3-TMP were recorded at 10° C. intervals from 20-80° C. and available in Table 1.

TABLE 1

Density (g/cm³) of 1,2,3-TMP at various temperatures (° C.)

| | Temp. (° C.) | | | | | |
|---|---|---|---|---|---|---|
| 20 | 30 | 40 | 50 | 60 | 70 | 80 |

| | | | | | | | |
|---|---|---|---|---|---|---|---|
| Density (g/cm³) | 0.94169 | 0.93171 | 0.92168 | 0.91155 | 0.90133 | 0.89099 | 0.88050 |

Example 4: Viscosity Measurements

Viscosity data were measured using a Brookfield DV-II+ Pro viscometer. The viscosity is based on a torque value and shear rate of a spindle in contact with a specified amount of fluid. For these experiments, the "ULA" spindle and jacketed sample cell was used because viscosities were <25 cP. This configuration requires a minimum fluid volume of 16 cm³. The accuracy of the viscometer is ±1% of the reading for torque measurements with a repeatability of ±0.2% of the reading. The viscosity of 1,2,3-TMP was measured at 10 temperature values between 19.8° C. and 80.2° C. The temperature was controlled by a Brookfield TC-602P circulating bath with a temperature stability of ±0.01° C. Values for viscosity are available in Table 2.

TABLE 2

Viscosity (cP) of 1,2,3-TMP at various temperatures (° C.)

| | Temp. (° C.) | | | | | |
|---|---|---|---|---|---|---|
| 20 | 30 | 40 | 50 | 60 | 70 | 80 |

| | | | | | | | |
|---|---|---|---|---|---|---|---|
| Viscosity (cP) | 1.07 | 1.05 | 1.03 | 1.01 | 0.95 | 0.89 | 0.83 |

Example 5: Gas Solubility in Glycerol Derivatives

As shown in FIG. 1, a glass pressure tube with threaded fitting glass vessel was filled with a known mass of solvent, a magnetic stir bar was added, and the vessel sealed with a PTFE threaded cap. The apparatus was placed in a tall-form 400 mL beaker filled with water. Pressure was monitored by a pressure sensor. A temperature-controlled hotplate with magnetic stirring was employed for heating and stirring of the water filled beaker. Temperature was measured with a thermocouple connected in a feedback loop to a hot plate with magnetic stirring capabilities.

The loaded vessel was connected to vacuum/gas/vent lines via the 3-way valve. First, the system was degassed at 30° C. via a vacuum pump to remove residual air from the headspace. After the pressure in the cell maintained a constant value while under vacuum, the initial mass of the system was recorded. Next, $CO_2$ at an absolute pressure of ~2 atm was introduced via 3-way valve, until the system came to equilibrium (as determined by readings that deviated no more than ±2 mm Hg for >20 min). The pressure was recorded, the vessel disconnected from the pressure sensor, removed from the water bath, dried, and the mass of the vessel recorded. The increase in the mass of the vessel relative to the initial state can be taken as the total mass of $CO_2$ added to the vessel distributed between the vapor and liquid phases.

The vessel was then returned to the water bath, reconnected to the pressure sensor and the bath heated to 45° C. while stirring. The system pressure was allowed to equilibrate at 45° C. and the pressure recorded. The process was repeated again at 60° C. and 75° C. After this procedure was completed, the system was cooled to 30° C., and the system was exposed to $CO_2$ at an absolute pressure of ~4 atm until equilibrium was reached, with the new mass of the system recorded. Equilibrium pressures were recorded at the same temperature intervals. The process was repeated a final time starting at 30° C. and an absolute pressure of $CO_2$ at ~6 atm.

Measuring the mass increase of the system allows for the number of total moles of $CO_2$ in the system to be calculated via Eqn. 1, where $n_{CO2}$ is the number of moles of $CO_2$ present in the system at a given T,P equilibrium, $m_i$ is the measured mass of the system at this equilibrium in g, $m_0$ is the initial mass of the degassed system in g, and MW is the molecular weight of $CO_2$ (44.01 g/mol)

$$n_{CO2} = \frac{mi - m_o}{MW} \quad (1)$$

Partitioning of $CO_2$ between the liquid and vapor phases can be calculated using Eqn. 2, where P is the absolute pressure in, z is the compressibility factor (as calculated from NIST REFPROP), $n_{vapor}$ is the number of moles of $CO_2$ in the headspace, R is the gas constant, T is the absolute temperature, $V_{total}$ is the volume of the empty reactor minus the known volume of the stir bar, $V_{TMP}$ is the volume of the solvent as calculated from the mass, temperature and density, $V_{crit}$ is the molar solubilized volume of $CO_2$ (taken as the critical volume, 34 cm³/mol), and $nCO_2$ is the total number of moles of $CO_2$ in the system as calculated from the mass balance in Eqn. 1.

$$P = \frac{z * n_{vapor} * R * T}{(V_{total} - V_{TMP} - V_{crit} * (nCO2 - n_{vapor}))} \quad (2)$$

Solving for $n_{vapor}$ at each equilibrium pressure gives the number of moles of $CO_2$ absorbed into the 1,2,3-TMP and the mole fraction of $CO_2$ in the solution can be determined via Eqn. 3.

$$n_{CO_2}^L = n_{CO_2} - n_{CO_2}^V \quad (3)$$

The mole fractions of $CO_2$ ($x^L_{CO_2}$) in the liquid phase at each given T, P condition is calculated from Eqn. 4:

$$x^L_{CO_2} = \frac{n^L_{CO_2}}{n^L_{CO_2} + n_S} \quad (4)$$

where $n_S$ is the moles of solvent (1,2,3-TMP or diglyme) originally added to the vessel.

The Henry's constant ($H_{CO_2,1}$(atm)) of $CO_2$ at each temperature, where $CO_2$ is the solute and 1=solvent (1,2,3-TMP or diglyme) was calculated from the inverse linear relationship in Eqn. 5:

$$H_{CO_2,1}(\text{atm}) = \frac{P(\text{atm})}{x^L_{CO_2}} \quad (5)$$

Figure 2:
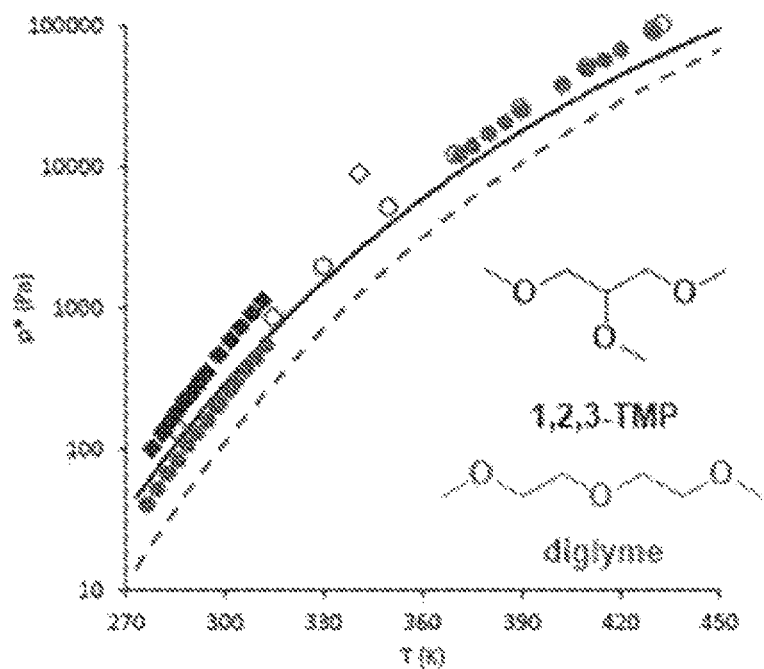
FIG. 2 shows a comparison of vapor pressure data for 1,2,3-TMP and diglyme. 1,2,3-TMP vapor pressure measured in this work (filled diamonds); Sutter's reported distillation condition for 1,2,3-TMP (hollow diamond); Diglyme vapor pressure measured in this work (filled circles); Diglyme vapor pressure measured by Stull (hollow circles); COMSOTherm vapor pressure calculation for 1,2,3-TMP (solid line); COSMOTherm vapor pressure calculation for diglyme (dashed line).
Figure 3A:
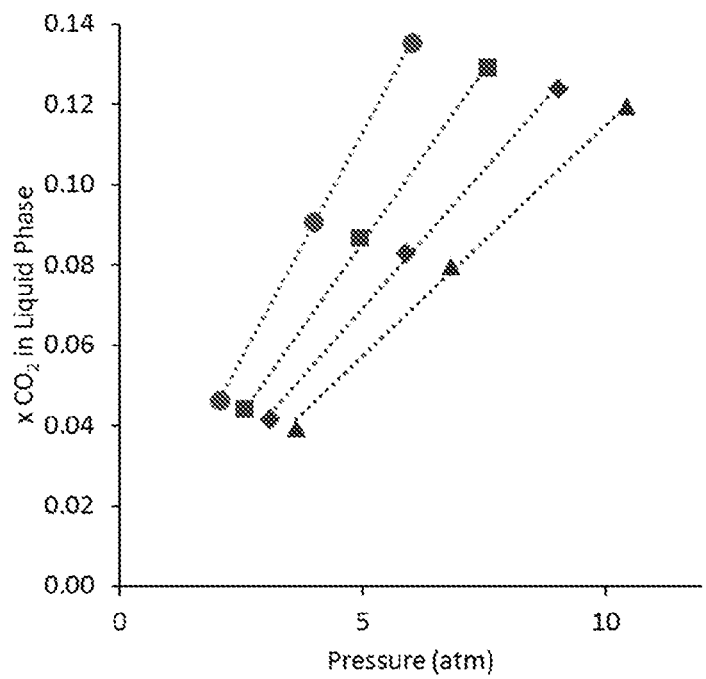
FIG. 3A shows the absorption isotherms relating the mole fraction of $CO_2$ in 1,2,3-TMP to the partial pressure of $CO_2$. Circles=30° C., Squares=45° C., Diamonds=60° C., Triangles=75° C. Dashed lines represent the linear least squares regression with intercept at origin.
Figure 3B:
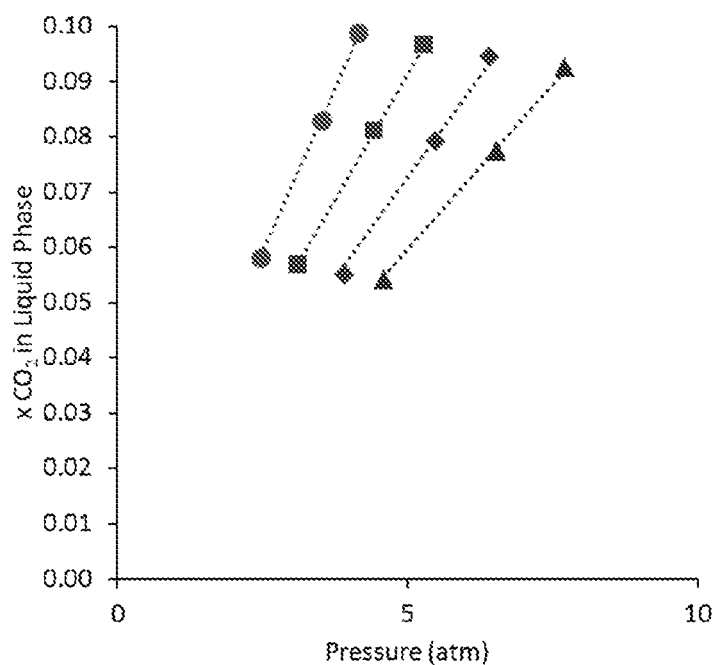
FIG. 3B shows the absorption isotherms relating the mole fraction of $CO_2$ in diglyme to the partial pressure of $CO_2$. Circles=30° C., Squares=45° C., Diamonds=60° C., Triangles=75° C. Dashed lines represent the linear least squares regression with intercept at origin.

In FIG. 2, $CO_2$ solubility was tested in diglyme and 1,2,3-TMP. The physical solubility of $CO_2$ in 1,2,3-TMP is greater than the physical solubility in diglyme, which was tested to mimic commercially utilized DMPEG. FIGS. 3A and 3B show the solubility of $CO_2$ in 1,2,3-TMP or diglyme as a function of temperature. Tables 3 and 4 show the solubility of $CO_2$ in 1,2,3-TMP and diglyme respectively.

TABLE 3

$CO_2$ solubility in 1,2,3-TMP.

| Temp (° C.) | H (atm) | $S_v$ (cm$^3$ (STP) cm$^{-3}$ atm$^{-1}$) | $S_m$ (mol kg$^{-1}$ atm$^{-1}$) |
|---|---|---|---|
| 30 | 44.2 +/− 0.4 | 3.88 +/− 0.19 | 0.186 +/− 0.009 |
| 45 | 58.3 +/− 0.9 | 2.89 +/− 0.14 | 0.141 +/− 0.007 |
| 60 | 72.4 +/− 1.9 | 2.26 +/− 0.14 | 0.112 +/− 0.007 |
| 75 | 87.2 +/− 3.2 | 1.83 +/− 0.13 | 0.092 +/− 0.007 |

TABLE 4

$CO_2$ solubility in diglyme.

| Temp (° C.) | H (atm) | $S_v$ (cm$^3$ (STP) cm$^{-3}$ atm$^{-1}$) | $S_m$ (mol kg$^{-1}$ atm$^{-1}$) |
|---|---|---|---|
| 30 | 42.1 +/− 0.3 | 4.02 +/− 0.11 | 0.192 +/− 0.005 |
| 45 | 54.7 +/− 0.2 | 3.04 +/− 0.07 | 0.148 +/− 0.004 |
| 60 | 68.8 +/− 1.5 | 2.36 +/− 0.10 | 0.117 +/− 0.005 |
| 75 | 83.8 +/− 0.8 | 1.91 +/− 0.06 | 0.096 +/− 0.003 |

Example 6: Comparison of Glycerol Derivatives to Existing Technologies

TABLE 5

Comparison of Physical and Chemical Properties

|  | 1,2,3-TMP | Diglyme | DMPEGs |
|---|---|---|---|
| Commercial Process name | N/A | N/A | Selexol |
| Viscosity (cP) | 1.05 | 1.2 | 5.8 |
| Specific Gravity (kg/m$^3$) | 937 | 939 | 1030 |
| Molecular Weight (g/mol) | 134.18 | 134.18 | ~280 |
| Vapor Pressure (Torr) | 2.62 | 1.20 | 0.00073 |
| Freezing Point (° C.) | TBD | −64 | −28 |
| Boiling Point (at 760 Torr) | ~140 | 162 | 275 |

TABLE 5-continued

Comparison of Physical and Chemical Properties

|  | 1,2,3-TMP | Diglyme | DMPEGs |
|---|---|---|---|
| Maximum Operating Temperature | Boiling Point | Boiling Point | 175 |
| $CO_2$ Solubility (ft$^3$/US gal) | 0.527 | 0.546 | 0.485 |
| $CO_2/CH_4$ | TBD | TBD | 15 |
| $H_2S/CO_2$ | TBD | 5.8 | 8.82 |
| $H_2O$ miscible? | Yes | Yes | Yes |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and methods disclosed herein are specifically described, other combinations of the compositions and methods also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of reducing acid gas from a stream, comprising contacting the stream with a solvent system comprising a glycerol derivative, wherein the glycerol derivative has the following structure:

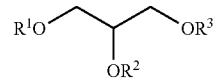

wherein
$R^1$, $R^2$ and $R^3$ are independently selected from the group consisting of $C_{1-20}$ alkyl, $C_{2-20}$ alkenyl, $C_{2-20}$ alkynyl, cycloalkyl, aryl, thio, alkoxyl, aryloxyl, $C_{2-20}$ fluoroalkyl, $C_2$-$C_{20}$ trifluoromethyl terminated alkyl, and $C_{2-20}$ nitrile terminated alkyl, any of which is optionally substituted with one or more substituents selected from the group consisting of ether, $C_1$-$C_5$ alkyl, halogen, amine, and $C_1$-$C_5$ alkoxy;
with the proviso that at least one of $R^1$, $R^2$, and $R^3$ is not $C(O)CH_3$.

2. The method of claim 1, wherein R', $R^2$ and $R^3$ are independently selected from the group consisting of $C_{1-20}$ alkyl, alkoxy, and $C_2$-$C_{20}$ trifluoromethyl terminated alkyl, any of which is optionally substituted with one or more substituents selected from the group consisting of ether, $C_1$-$C_5$ alkyl, halogen, amine, and $C_1$-$C_5$ alkoxy.

3. The method of claim 1, wherein the viscosity of the glycerol derivative is at or below 5 cP at 25° C.

4. The method of claim 1, wherein the glycerol derivative is selected from the group consisting of 1,2,3-trimethoxypropane, 1,2,3-triethoxypropane, and 1,2,3-tris(2,2,2-trifluoroethoxy)propane.

5. The method of claim 1, wherein the acid gas is selected from the group consisting of carbon dioxide, sulfur dioxide, hydrogen sulfide, and mixtures thereof.

6. The method of claim 1, wherein the stream is selected from the group consisting of natural gas, byproducts of a chemical reaction, and post-combustion flue gas.

7. The method of claim 1, wherein the stream comprises the gaseous products produced from a water-gas shift reaction.

8. The method of claim 1, wherein the acid gas is removed from the stream through absorption into the glycerol derivative.

9. The method of claim 1, wherein the solvent system comprises at least 50% of the glycerol derivative by volume.

10. The method of claim 1, wherein the solvent system contacts the stream in a hollow fiber membrane contactor.

11. The method of claim 1, wherein $R^1$, $R^2$, and $R^3$ are independently selected from the group consisting of unsubstituted $C_{1-20}$ alkyl, unsubstituted $C_{2-20}$ alkenyl, unsubstituted $C_{2-20}$ alkynyl, unsubstituted cycloalkyl, unsubstituted aryl, unsubstituted thio, unsubstituted alkoxyl, unsubstituted aryloxyl, unsubstituted $C_{2-20}$ fluoroalkyl, unsubstituted $C_2$-$C_{20}$ trifluoromethyl terminated alkyl, and unsubstituted $C_{2-20}$ nitrile terminated alkyl.

12. The method of claim 1, wherein $R^1$, $R^2$ and $R^3$ are independently selected from the group consisting of unsubstituted $C_{1-20}$ alkyl, unsubstituted alkoxy, and unsubstituted $C_2$-$C_{20}$ trifluoromethyl terminated alkyl.

13. The method of claim 1, wherein $R^1$, $R^2$, and $R^3$ are independently selected from the group consisting of —$CH_3$, —$CH_2CH_3$, —$CH_2CF_3$, and —$CH_2CH_2OCH_3$.

14. The method of claim 1, wherein $R^1$, $R^2$, $R^3$ are not all the same.

15. A method for sweetening a natural gas feed stream, comprising contacting the natural gas feed stream, wherein the natural gas feed stream comprises acid gases, with a solvent system comprising a glycerol derivative, wherein the glycerol derivative has the following structure:

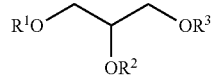

wherein
$R^1$, $R^2$ and $R^3$ are independently selected from $C_{1-20}$ alkyl, $C_{2-20}$ alkenyl, $C_{2-20}$ alkynyl, cycloalkyl, aryl, thio, alkoxyl, aryloxyl, $C_{2-20}$ fluoroalkyl, $C_2$-$C_{20}$ trifluoromethyl terminated alkyl, and $C_{2-20}$ nitrile terminated alkyl, any of which is optionally substituted with one or more substituents selected from the group consisting of ether, $C_1$-$C_5$ alkyl, halogen, amine, and $C_1$-$c_5$ alkoxy; with the proviso that at least one of $R^1$, $R^2$, and $R^3$ is not $C(O)CH_3$.

16. The method of claim 15, wherein $R^1$, $R^2$ and $R^3$ are independently selected from $C_{1-20}$ alkyl, alkoxy, and $C_2$-$C_{20}$ trifluoromethyl terminated alkyl, any of which is optionally substituted with one or more substituents selected from the group consisting of ether, $C_1$-$C_5$ alkyl, halogen, amine, and $C_1$-$C_5$ alkoxy.

17. The method of claim 15, wherein the viscosity of the glycerol derivative is at or below 5 cP at 25° C.

18. The method of claim 15, wherein the glycerol derivative is selected from the group consisting of 1,2,3-trimethoxypropane, 1,2,3-triethoxypropane, and 1,2,3-tris(2,2,2-trifluoroethoxy)propane.

19. The method of claim 15, wherein the acid gas is selected from the group consisting of carbon dioxide, sulfur dioxide, hydrogen sulfide, and mixtures thereof.

20. The method of claim 15, wherein the acid gas is removed from the natural gas feed stream through absorption into the glycerol derivative.

21. The method of claim 15, wherein the solvent system comprises at least 50% of the glycerol derivative by volume.

22. The method of claim 15, wherein the solvent system is used within a hollow fiber membrane contactor.

23. The method of claim 15, wherein $R^1$, $R^2$, and $R^3$ are independently selected from the group consisting of unsubstituted $C_{1-20}$ alkyl, unsubstituted $C_{2-20}$ alkenyl, unsubstituted $C_{2-20}$ alkynyl, unsubstituted cycloalkyl, unsubstituted aryl, unsubstituted thio, unsubstituted alkoxyl, unsubstituted aryloxyl, unsubstituted $C_{2-20}$ fluoroalkyl, unsubstituted $C_2$-$C_{20}$ trifluoromethyl terminated alkyl, and unsubstituted $C_{2-20}$ nitrile terminated alkyl.

24. The method of claim 15, wherein $R^1$, $R^2$ and $R^3$ are independently selected from the group consisting of unsubstituted $C_{1-20}$ alkyl, unsubstituted alkoxy, and unsubstituted $C_2$-$C_{20}$ trifluoromethyl terminated alkyl.

25. The method of claim 15, wherein $R^1$, $R^2$, and $R^3$ are independently selected from the group consisting of —$CH_3$, —$CH_2CH_3$, —$CH_2CF_3$, and —$CH_2CH_2OCH_3$.

26. The method of claim 15, wherein $R^1$, $R^2$, $R^3$ are not all the same.

* * * * *